United States Patent
Tran et al.

(10) Patent No.: US 6,908,267 B1
(45) Date of Patent: Jun. 21, 2005

(54) VARIABLE RADII CUTTER

(76) Inventors: Hiep N. Tran, 3 Walsh Ave., Peabody, MA (US) 01960; Haris Doumanidis, 8133 Prescott Dr., Apt. No. 102, Vienna, VA (US) 22180

( * ) Notice: Subject to any disclaimer, the term of this patent is extended or adjusted under 35 U.S.C. 154(b) by 61 days.

(21) Appl. No.: 10/407,051

(22) Filed: Apr. 4, 2003

(51) Int. Cl.$^7$ .................................................. B23C 5/00
(52) U.S. Cl. ........................ 409/234; 408/153; 408/158; 409/232; 451/504; 451/507
(58) Field of Search ................................ 409/234, 232, 409/143; 408/147, 150, 153, 158, 161, 168; 451/504, 507, 430; 15/104.09, 104.31; 606/180

(56) References Cited

U.S. PATENT DOCUMENTS

| | | | | |
|---|---|---|---|---|
| 2,189,452 A | * | 2/1940 | Stone | 403/180 |
| 2,287,916 A | * | 6/1942 | Therrien | 15/104.33 |
| 2,730,101 A | * | 1/1956 | Hoffman | 606/159 |
| 3,112,659 A | * | 12/1963 | Klages et al. | 408/153 |
| 3,118,324 A | * | 1/1964 | Evans | 76/108.1 |
| 3,166,876 A | | 1/1965 | Manchester | |
| 3,542,528 A | * | 11/1970 | Bech | 407/37 |
| 4,846,290 A | | 7/1989 | Jones | |
| 4,966,604 A | * | 10/1990 | Reiss | 606/159 |
| 5,672,096 A | * | 9/1997 | Amarosa et al. | 451/504 |
| 6,086,466 A | * | 7/2000 | Tasin et al. | 451/495 |
| 6,139,414 A | * | 10/2000 | Domanski et al. | 451/471 |
| 6,152,814 A | * | 11/2000 | Amarosa et al. | 451/526 |

FOREIGN PATENT DOCUMENTS

JP          56-146604 A   * 11/1981

* cited by examiner

Primary Examiner—Erica Cadugan
(74) Attorney, Agent, or Firm—Joseph R. Birkner

(57) ABSTRACT

A variable radii cutter which eliminates the need for having to provide a wide assortment of cutting tool bits for continuously imparting various sizes of radii on a workpiece is disclosed. In one embodiment, the variable radii cutter has a cutter in the form of a plurality of blades which mechanically expand and contract in response to one of an automated adjustment mechanism and a manual adjustment for accommodating various sizes of radii. In another embodiment, a ball made of rubber having an abrasive disposed thereon is used as the cutter and operates in the same manner as described above.

20 Claims, 7 Drawing Sheets

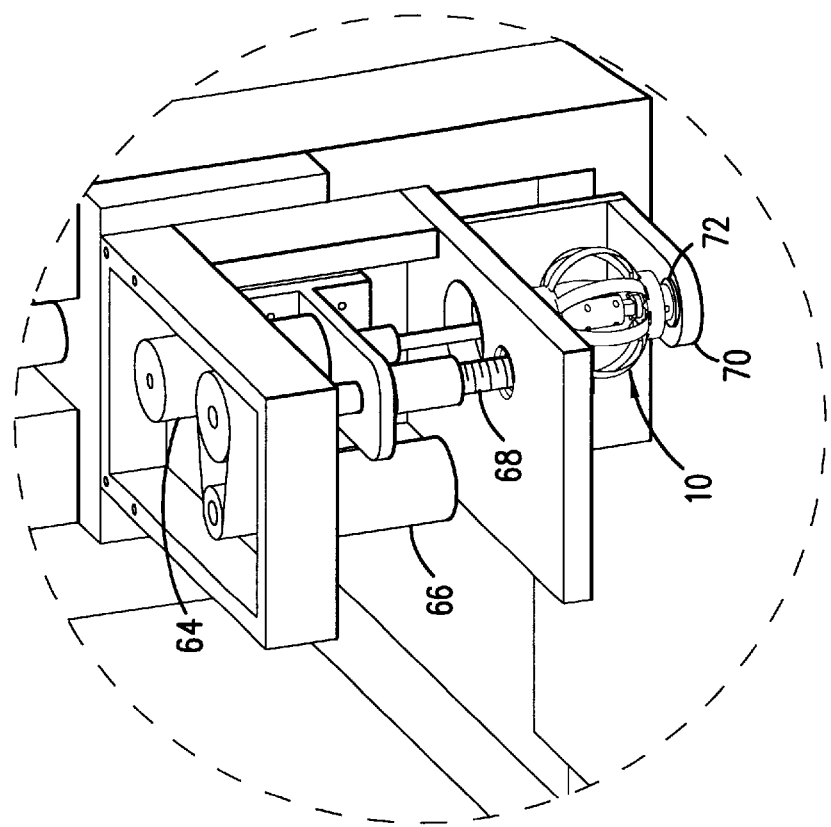
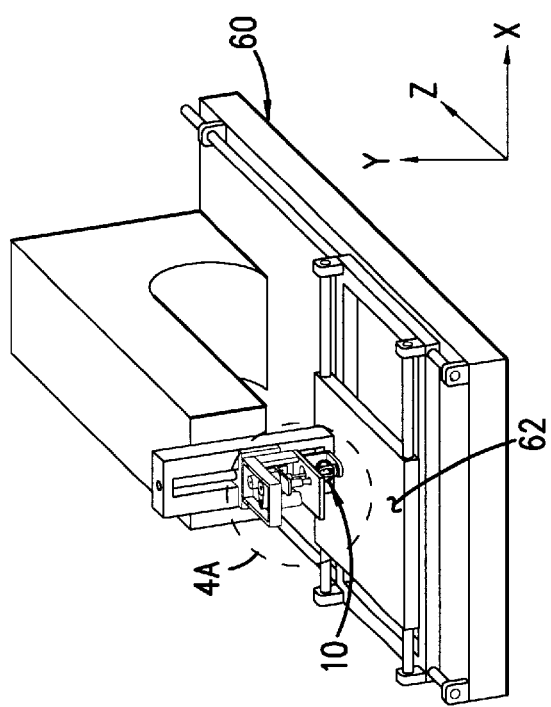
FIG. 4A
FIG. 4 i# VARIABLE RADII CUTTER

FIELD OF THE INVENTION

This invention relates generally to a cutting apparatus. More particularly, the present invention relates to a universal cutting tool in the form of a variable radii cutter that cuts various sizes of radii on a workpiece by mechanically adjusting the size of the cutter for the particular radii to be cut without the need for tool bit changes.

BACKGROUND OF THE INVENTION

Typical machining operations such as milling and routing utilize specially designed tool bits that have a fixed radii cutting feature thereon. A problem with such traditional tools is that most machined parts have varying contours such as a changing radius on the edge concave, a fillet at a corner, multiple radii and other rapidly changing features which require a machinist to find and then to frequently exchange the tool bit with an appropriate one to form the final shape of the part. This is time consuming and frustrating particularly when the machinist must search through dozens of tool bits until the correct one is located. Furthermore, if a particular tool bit is unsuitable for the cutting task, the machinist oftentimes grinds and machines the tool bit in an attempt to simulate the desired radii to be cut. This, too, is time consuming and ruins the tool bit as well as compromising the accuracy of the workpiece.

No device is known such as a variable radii cutter that conveniently allows cutting a wide variation in radii with a single tool which minimizes the need for a large tool bit inventory and frequent tool bit changes and which is simple in design, versatile and is easy to use.

In view of the above mentioned problems and limitations associated with traditional cutting tools, it was recognized by the present inventor that there is an unfulfilled need for an improved cutting tool which can be varied in size to accommodate changing radii needs on a part being machined and one which is simple in design, practical, fun to use and is economically manufactured.

Accordingly, it becomes clear that there is a great need for a variable radii cutting tool which overcomes the disadvantages associated with traditional tool bits used in machining operations. Such a cutting tool should be one that minimizes the need to frequently change tool bits and one which eliminates the fixed radii features associated with standard tool bits.

SUMMARY OF THE INVENTION

It is therefore an object of this invention to provide a single cutting tool in the form of a variable radii cutter which avoids the aforementioned machining operation problems associated with the use of conventional cutting tool bits.

It is an object of this invention to provide a variable radii cutter which is capable of changing its cutting radius so that a single cutter may be used as a replacement for multiple tool bits.

It is another object of this invention to provide a variable radii cutter which operates with an automated adjustment mechanism.

It is another object of this invention to provide a variable radii cutter which operates with a manual adjustment.

It is a further object of this invention to provide a variable radii cutter which may be manufactured from readily available materials by conventional manufacturing processes.

It is a still a further object of this invention to provide a variable radii cutter that is simple in design, simple to manufacture, low in cost and fun to use.

This invention results from the realization that there is a great need for a variable radii cutter that can conveniently and effortlessly cut various sizes of radii on a workpiece without having to frequently change the cutter. The resulting invention provides a user the capability of conveniently and efficiently being able to rapidly fabricate a part with a single tool, thereby saving time and money.

The above and the other objects are achieved in accordance with the present invention, which, according to a first aspect, provides a variable radii cutter comprising a shaft having an upper portion slideably coupled to a lower portion; a spindle disposed in an opposed spaced relationship on the upper portion and on the lower portion of the shaft; a cutter means disposed between the spindle and about the shaft and the cutter means removably attachable thereto the spindle and means for varying a radius of the cutter means so that various radii may be cut on a workpiece with the variable radii cutter.

The second aspect is a special case of the first aspect of this invention with additional features. According to a second aspect of the invention the means for varying the radius of the cutter means includes an automated adjustment mechanism.

The third aspect is a special case of the first aspect of this invention with additional features. According to a third aspect of the invention the means for varying the radius of the cutter means includes a manual adjustment.

The fourth aspect is a method for cutting various sizes of radii on a workpiece with a variable radii cutter without a need to replace the variable radii cutter for each profile cut on the workpiece.

BRIEF DESCRIPTION OF THE DRAWINGS

In the accompanying drawings:

FIG. 4 is a perspective view of the variable radii cutter mounted in an automated adjustment mechanism;

FIG. 4A is a perspective view showing a detailed view of the automated adjustment mechanism of FIG. 4;

FIG. 5A is a perspective view of the cutter means of FIG. 5; and

DETAILED DESCRIPTION OF ILLUSTRATIVE EMBODIMENTS

Figure 1:
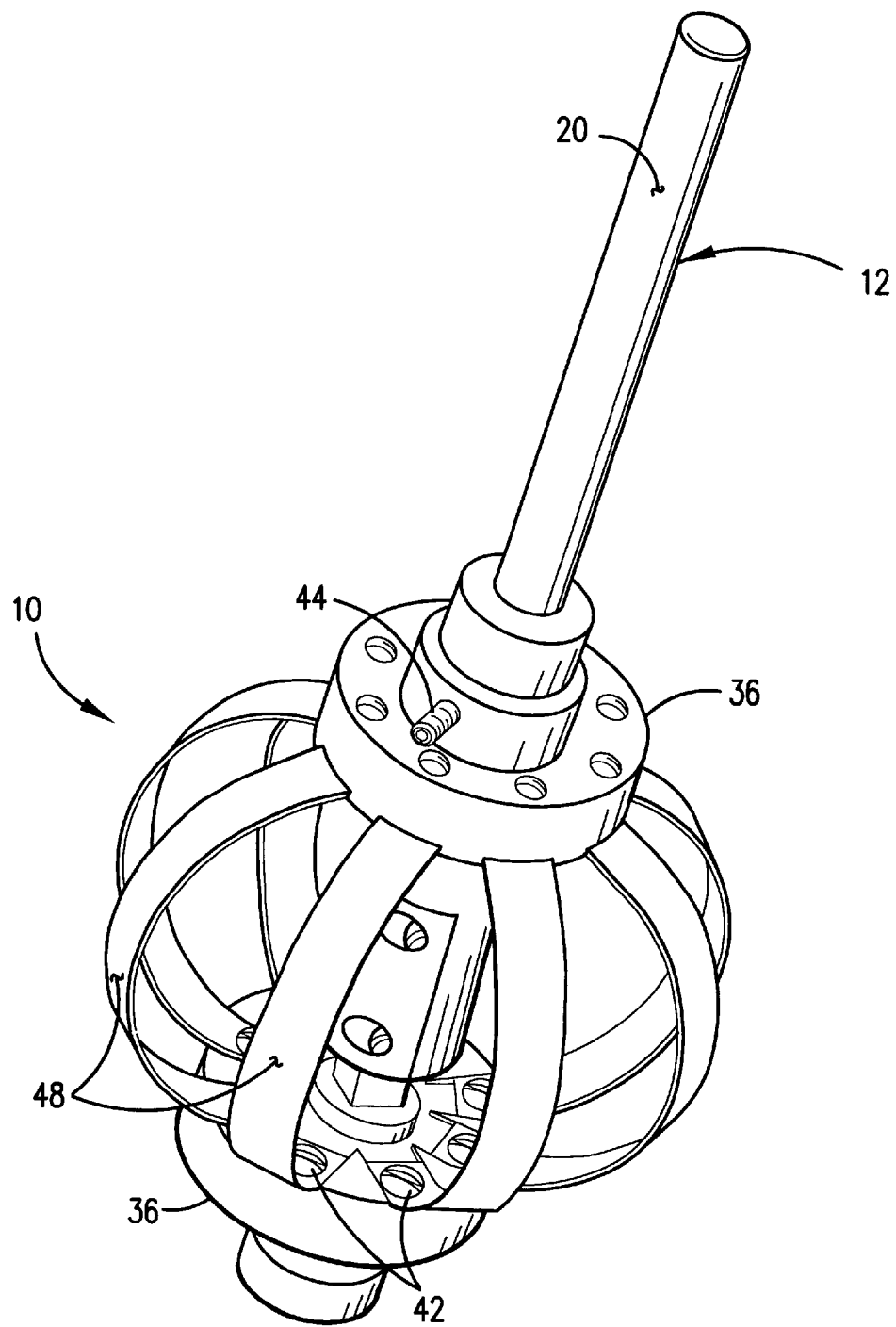
FIG. 1 is a perspective view of an embodiment of a variable radii cutter of the instant invention.
Figure 2:
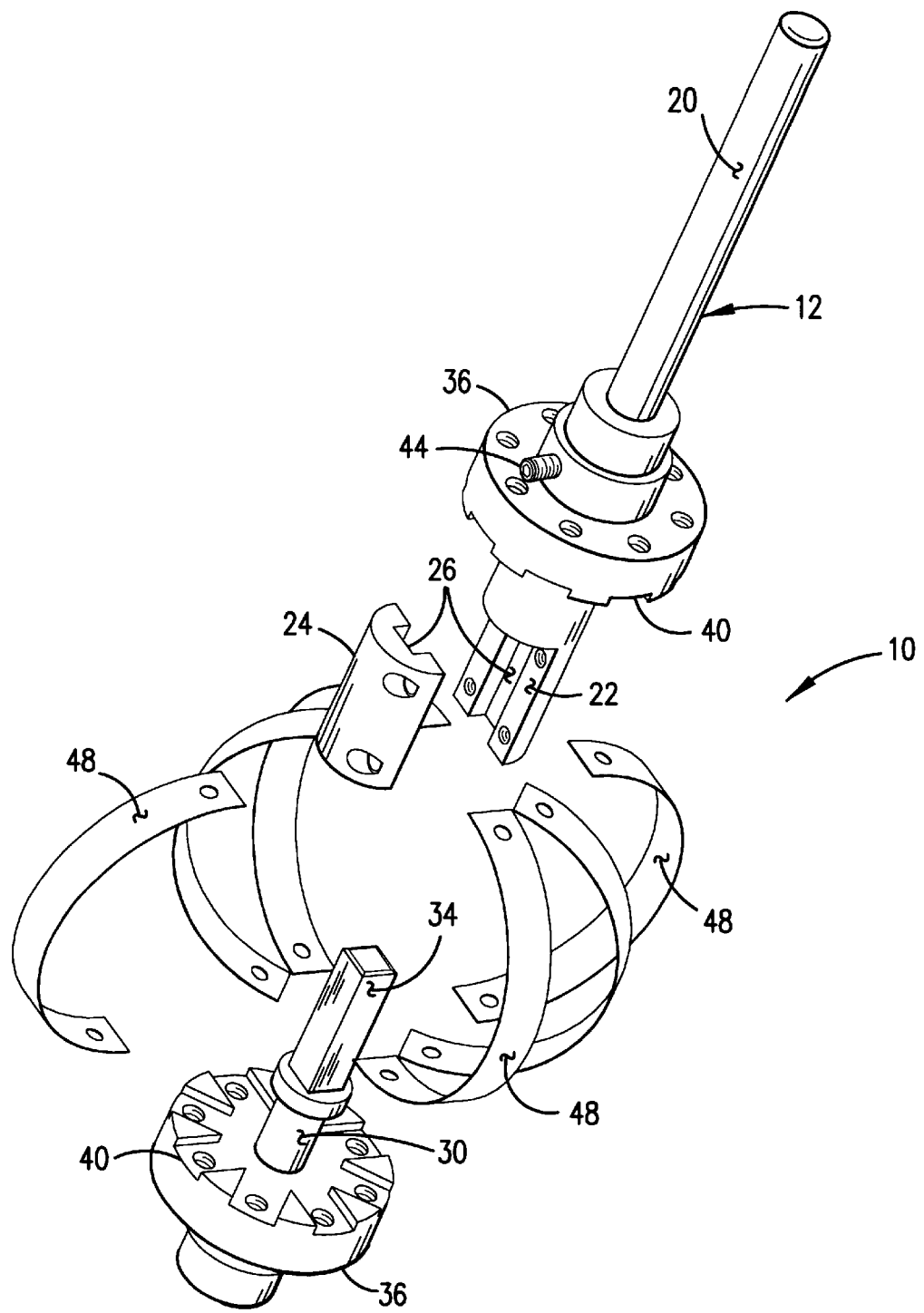
FIG. 2 is an exploded view of the variable radii cutter of FIG. 1.
Figure 6:
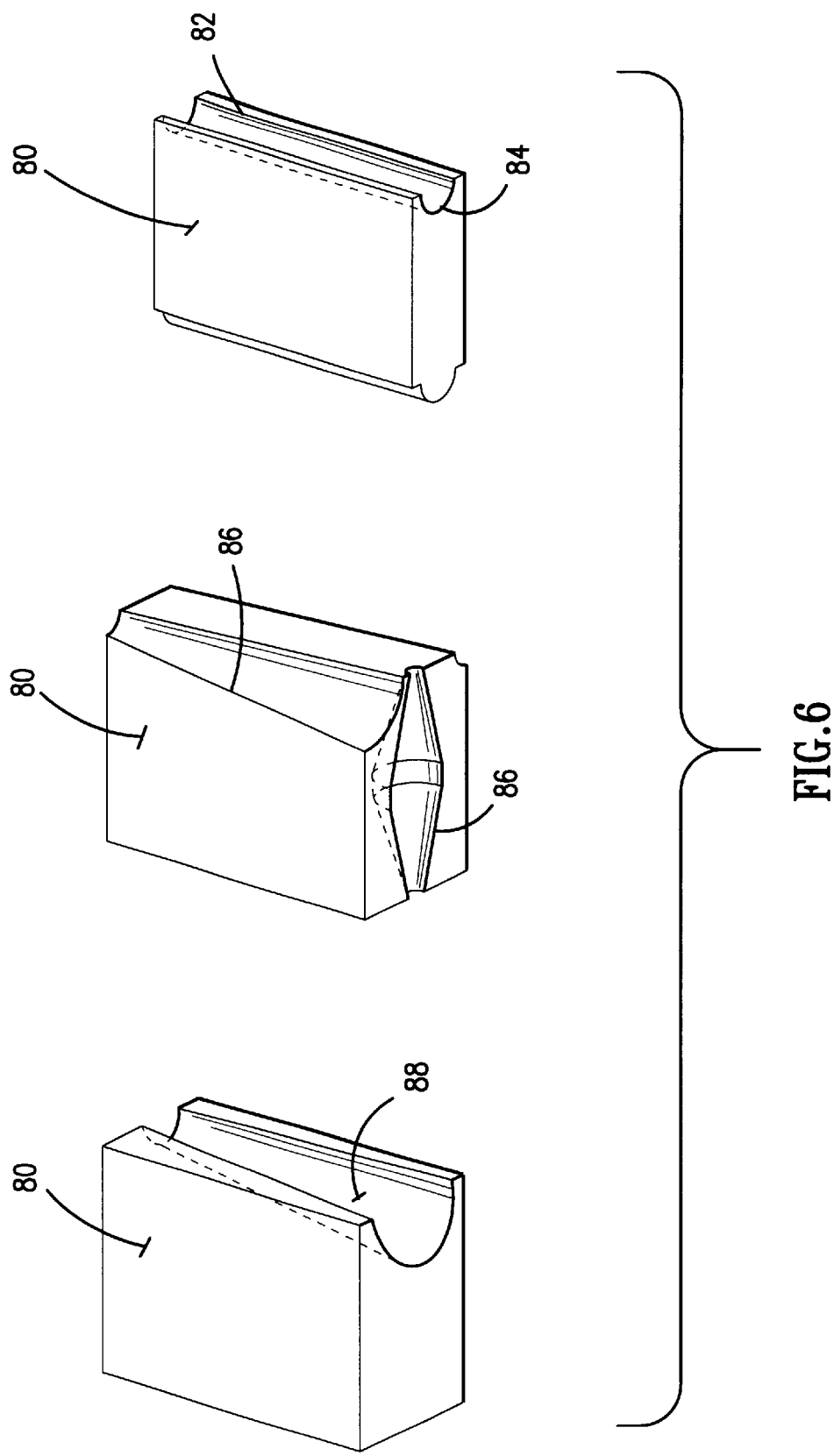
FIG. 6 is a perspective view illustrative of typical cut profiles on various workpieces produced by the variable radii cutter of the instant invention.
Figure 7:
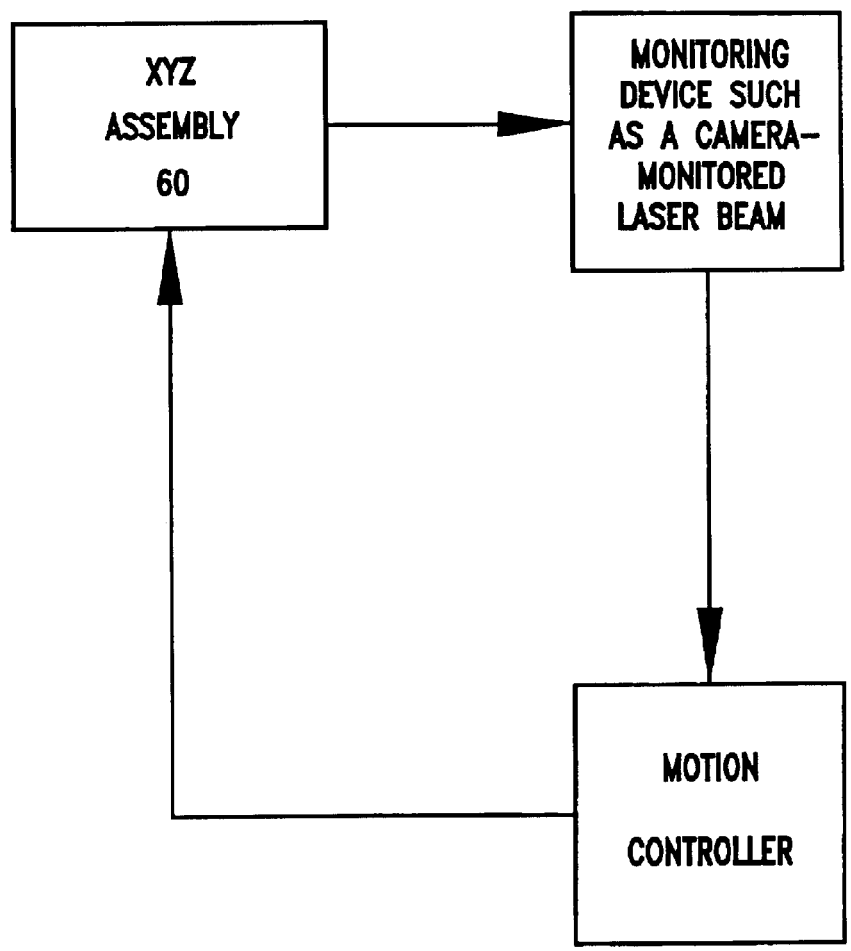
FIG. 7 is a schematic view of the monitoring device and controller for the xyz assembly.

Looking more particularly at the drawings, there is shown in FIG. 1 and in FIG. 2, a preferred embodiment of a variable radii cutter which is generally indicated at 10, according to a preferred embodiment of the present invention. FIG. 1 is a perspective view of an embodiment of a variable radii cutter 10 shown completely assembled, while FIG. 2 is an exploded view of the variable radii cutter 10 of FIG. 1 showing the components of an illustrative embodiment of the instant invention. As best seen in FIGS. 1 and 2, the major components of the variable radii cutter 10 include a shaft 12 having an upper portion 20 and a lower portion 30, a spindle 36 disposed in an opposed spaced relationship on the upper portion 20 and on the lower portion 30 of the shaft 12. In one illustrated embodiment, a cutter means in the form of a blade 48 is disposed between the spindle 36 and about the shaft 12 and the cutter means is removably attachable to the spindle 36. There are means for varying a radius of the cutter means so that various radii may be cut on a workpiece 80 shown in FIG. 6, including, but not limited to, a taper 88, a variable radius 86, a constant edge radius 82 and a negative radius edge 84.

The upper portion 20 of the shaft 12 has a split collar 22 and a coupling 24 removably attachable to and cooperating with the split collar 22. The split collar 22 and the coupling 24 each having a keyway 26 therein. The lower portion 30 of the shaft 12 has a crown 32 and a rod member 34 extending from the crown 32 for cooperating with the keyway 26 of the split collar 22 and with the keyway 26 of the coupling 24 of the upper portion 20 of the shaft 12. Utilizing a split shaft design, the upper portion 20 is keyed to and slideably coupled to the lower portion 30 of the shaft 12 to provide compression of the cutter means under load and to transfer rotational cutting speed as well as length modulation in operation.

The blade 48 is generally rectangular in shape when relaxed and expandable when in a preloaded condition and during a cutting operation to define a generally spherical shape when the blade 48 is disposed therebetween the spindle 36 about the shaft 12. Preferably the blade 48 is made of a thin strip of hardened spring steel. Also, preferably, a plurality of blades 48 may be used depending upon the particular size of the spindle 36. Blade 48 may be disposed about the spindle 36 utilizing guide means in the form of a groove 32 and removably attachable to the spindle 36 with a fastener 42.

The means for varying the radius of the cutter means includes an automated adjustment mechanism 56 seen in FIGS. 4 and in 4A that includes a computer program controlled xyz assembly 60 having a cutter motor 64, a compression motor 66, a lead screw 68, a base support 70 and a work platform 62 cooperating with the variable radii cutter 10. The compression motor 66 cooperating with the lead screw 68 for applying a variable axial force to the cutter means responsive to the geometry of the workpiece 80 placed on the work platform 62, as programmed, so that the cutter means profiles the particular workpiece geometry to be cut and automatically changes the radii of the cutter means to complete the cut.

The upper portion 20 of shaft 12 of the variable radii cutter 10 is mounted to the cutter motor 64 with a force coupling. Material removal is controlled by the cutting speed of the cutting motor 64 which preferably is a direct drive D.C. motor which can vary speed by modulating the input voltage supply. The lead screw 68 may be a medium threaded ball screw.

The xyz assembly 60 utilizes a motion controller. The x-y motion is used to provide edge cutting while the z axis is used to compensate the alteration of maximum deflection location of the cutter means. The part geometry together with the desired edge radii are transferred to the motion controller, via a CAD (computer aided design) file to a motion conversion program. The initial cutting location or part mounting location is also taught to the motion controller. After processing this information, a single start command is issued to the xyz assembly 60 to initiate the cutting process. Since the blade 48 of the cutter means is pressed axially from one end, the maximum deflection locations for multiple blades also move axially. In order to maintain the blade 48 maximum deflection location constant, the motion controller will compensate for this location by modulating its z axis in either an upward or in a downward direction.

Since the motion controller monitors the amount of force applied to the cutter means via an allowable error limit setting provided by a motor encoder, it does not have the capability to detect a flexing or a broken blade or process geometry error. Additional process feedback is employed. For process feedback, a laser stripe technique cooperating with a CCD (charge coupled device) Camera for monitoring the cutting process may be utilized to monitor and to detect the cutter means function and operation and to stop operation in the event of a cutter means malfunction such as a broken blade or ball. A low power laser diode may be positioned perpendicular to the cutting path. The laser beam forms a single line across the new cutting profile. An image of the line is continually monitored by the CCD camera which is mounted in front of the work piece. Depending upon the feedback information, the motion controller will modulate the blade cutting geometry and position accordingly. It is understood that, in lieu of the CCD camera and the laser diode, one of optical sensors and ultrasonic sensors may be used for process feedback without departing from this disclosure.

It is understood that the cutting process performed on the workpiece 80 does not have to be in the vertical direction where the cutter means is perpendicular to the edge of the workpiece 80; the entire xyz assembly 60 can be angle mounted where the variable radii cutter 10 is forming a cutting profile at a specific angle on the edge of the workpiece 80. The xyz assembly 60 can also be mounted horizontally and parallel to the horizontal surface of the workpiece 80 where a profile can be formed thereon.

Figure 3:
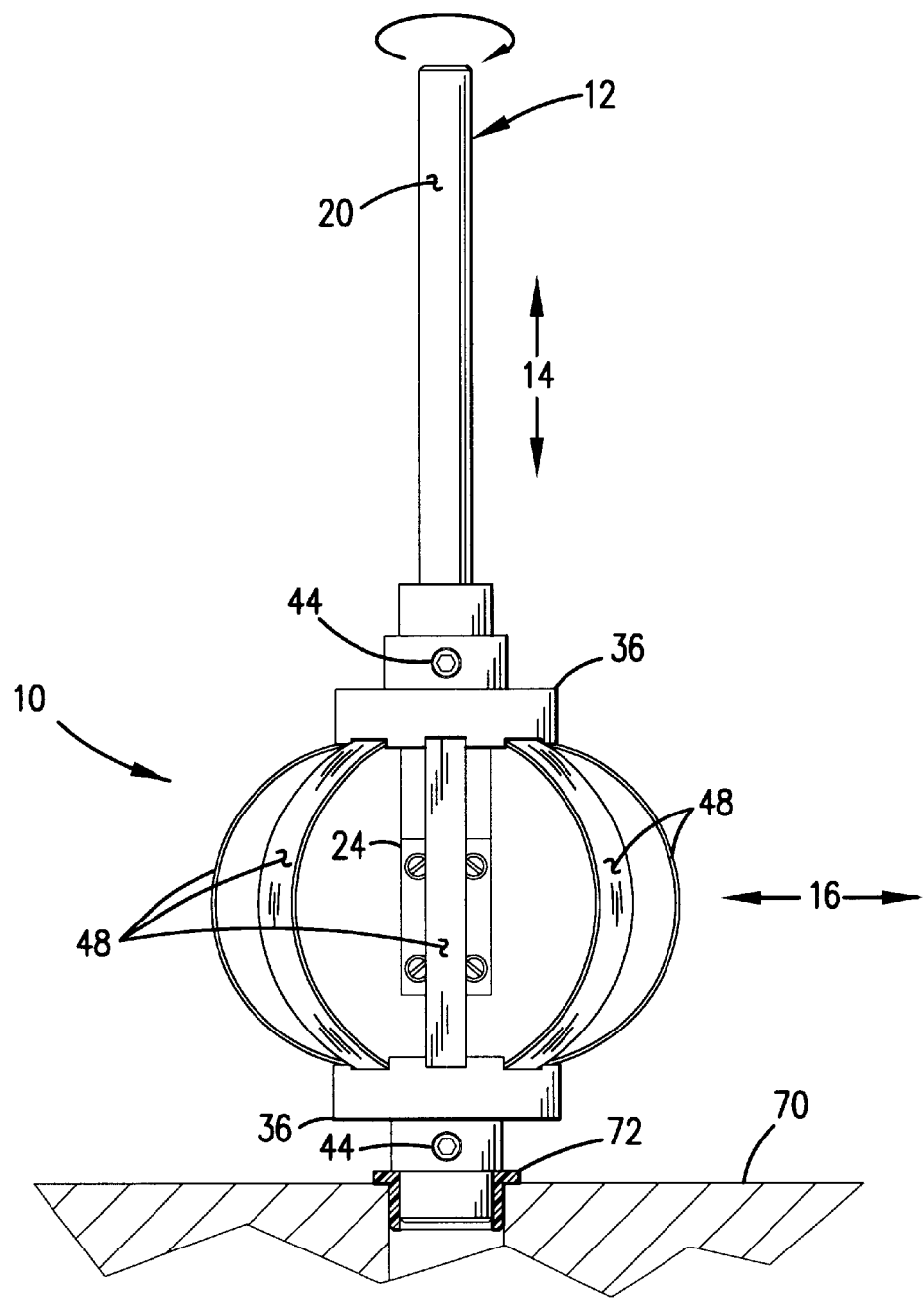
FIG. 3 is a front elevation view showing the general principle of operation of the variable radii cutter of FIG's. 1 and 2.

FIG. 3 is a front elevation view showing the general principle of operation of the variable radii cutter 10 of FIGS. 1 and 2 mounted in a bearing 72 disposed in the base support 70. When a modulated axial force, as indicated by the arrow 14 is applied by the automated adjustment mechanism 56 described above, deflection occurs and the cutter means in the form of blade 48 of the variable radii cutter 10 expands and contracts thereby modulating the radius of the cutter means, as indicated by the arrow 16, so that various sizes of radii may be cut without the need to change cutting tool bits.

In another illustrative embodiment, the means for varying the radius of the cutter means includes a manual adjustment utilizing a set screw 44 disposed on the spindle 36 which is fixed to the shaft 12 after setting the radius of the cutter means. By making manual adjustments the variable radii cutter 10 may be used in milling, drilling and in routing operations when automation is not needed thereby making the variable radii cutter 10 more useful for practically any cutting operation. For manual operation, suitable guide fixtures such as those employed for routers may be used when removing material along an edge of a workpiece 80.

The variable radii cutter 10 may be utilized to perform multiple radii cuts with a single tool and can cut numerous complex profiles particularly on foam, wax, wood and on metal including spherical conical and negative curvature along edges of a material. It is easy to assemble and to use and may be integrated into CNC (computer numerical control) or manual systems.

Figure 5:
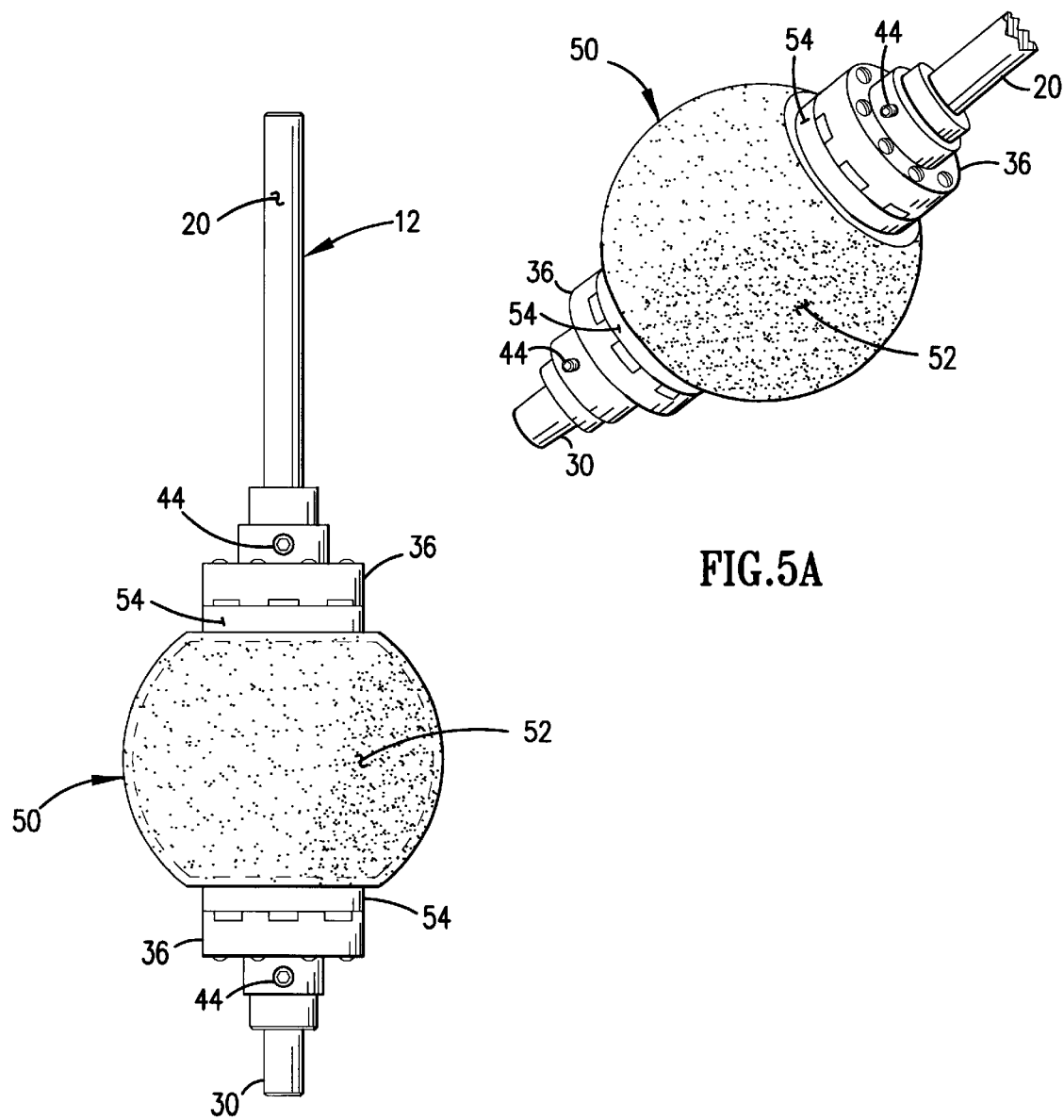
FIG. 5 is an front elevation view of a cutter means in the form of a ball with an abrasive.

In another illustrative embodiment, the cutter means is a ball 50 having an abrasive 52 disposed thereon and a disk 54 for mounting the spindle 36 to the ball 50 as seen in FIG. 5 and in FIG. 5A. The ball 50 is made of rubber and may be fabricated by preparing a mixture of rubber and abrasive material used to define a flexible sphere by a molding process. Disk 54, made of steel, and used for mounting the spindle 36 thereto, may be molded together with the ball 50 and tapped holes to receive the fastener 42 passing through holes in the spindle 36 are later added. The ball 50 is mounted on the shaft 12 between the spindle 36 and operation is the same as described above for the blade 48 including the utilization of the automated adjustment mechanism 56 and the manual adjustment utilizing the set screw 44 disposed on the spindle 36 for setting the radius of the cutter means.

EXAMPLE

The variable radii cutter 10 was actually reduced to practice according to the teachings of this invention. A prototype was made and tested with good results while automatically cutting workpieces made of foam, wax, wood and metal. The prototype utilized a cutter means in the form of eight (8) hardened spring steel blades connected to a pair of spindles attached to a shaft at an upper portion and at a lower portion. The blades were fabricated from standard 32 gage flat stock spring steel and were machined to about 0.25 inch (0.06 cm) wide and 2.68 inch (6.8 cm) long. The number of blades chosen included consideration for proper rotational inertia balance for mounting on the milled guide means in the form of a groove on the spindle. The blades were removably attachable with threaded fasteners passing through holes in the blades and into the corresponding tapped holes in the spindle. The blades, spindle and the shaft were made from stainless steel. The variable radii cutter 10 utilized an automated adjustment mechanism including an xyz assembly which was motorized and computer controlled for use in automatically varying the radius of the blades during cutting. A motion system having a motion controller and a power amplifier was used for modulating the blade cutting geometry as a function of feedback information received by the motion controller. For process feedback, a laser stripe technique, with a low power laser diode was positioned perpendicular to the cutting path, and cooperated with a CCD (charge coupled device) Camera mounted in front of the work piece for monitoring the cutting process.

A manual adjustment, when automation is not needed, was accomplished by use of a set screw disposed on the spindle which was fixed to the shaft, for manually setting the radius of the cutter means during a routing operation. For manual operation, a router guide fixture was used when removing material along an edge of the workpiece. Good cutting results were also obtained for the manual adjustment operation.

The variable radii cutter 10 may be fabricated from readily available materials and by conventional fabrication and assembly techniques. Metal forming, molding and machining operations may be employed for fabrication of the major components.

Surprisingly, the instant invention provides an added advantage and recognizes a problem and adequately and completely addresses an unfulfilled need, in that a variable radii cutter 10, in the manner disclosed, in effect, provides a convenient device which eliminates the need for using a wide assortment of cutting tool bits having fixed radii features whereas a single variable radii cutter provides the desired above mentioned advantages and benefits to a user. It is understood that the variable radii cutter 10 may be constructed in a wide variety of sizes, shapes and style variations. For example, the cutter means for the variable radii cutter 10 may be made from a plurality of rectangular strips of flexible metal defining a spherical shape when assembled and a unitary rubberized ball having an abrasive thereon. One practical advantage of the invention is that it provides a convenient, practical, low cost, variable radii cutter 10 which allows a user to conveniently cut various variable contours on a workpiece with a single tool. Another advantage is that automatic or manual operation may be selectively chosen without design modification, thereby making the variable radii cutter 10 a versatile and a highly universal cutting tool. Of course, a wide variety of further uses and advantages of the present invention will become apparent to one skilled in the art.

As disclosed, it is apparent that the instant invention can provide other options. One skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention. Although the invention has been shown and described with reference to certain illustrated embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A variable radii cutter comprising:

a shaft having an upper portion and a lower portion;

said upper portion of said shaft having a split collar and a coupling removably attachable to and cooperating with said split collar wherein said split collar and said coupling each having a keyway therein;

said lower portion of said shaft having a crown and a rod member extending from said crown for cooperating with the keyway of said split collar and with the keyway of said coupling of said upper portion of said shaft;

a spindle disposed in an opposed spaced relationship on said upper portion and on said lower portion of said shaft;

a flexible cutter means disposed between said spindle and about said shaft, and said cutter means being removably attachable to said spindle;

means for varying a radius of said cutter means by flexing said cutter means so that various radii may be cut on a workpiece with said variable radii cutter; and means for holding said cutter means at the various radii.

2. The variable radii cutter of claim 1 wherein said cutter means is a blade generally rectangular in shape when relaxed and expandable when in a preloaded condition and during a cutting operation to define a generally spherical shape when said blade is disposed between the spaced portions of said spindle about said shaft.

3. The variable radii cutter of claim 2 wherein said spindle having a guide means for aligning said blade including a groove.

4. The variable radii cutter of claim 3 wherein said blade is removably attachable to said spindle with a fastener.

5. The variable radii cutter of claim 4 wherein said blade is fabricated from steel.

6. The variable radii cutter of claim 5 wherein said means for varying the radius of said cutter means includes an automated adjustment mechanism.

7. The variable radii cutter of claim 6 wherein said automated adjustment mechanism includes a computer program controlled xyz assembly having a cutter motor, a compression motor, a lead screw, a base support and a work platform cooperating with said variable radii cutter.

8. The variable radii cutter of claim 7 wherein said compression motor cooperating with said lead screw for applying a variable axial force to said cutter means responsive to the geometry of the workpiece placed on said work platform, as programmed, so that said cutter means profiles the particular workpiece geometry to be cut and automatically changes the radii of said cutter means to complete the cut.

9. The variable radii cutter of claim 8 wherein said automated adjustment mechanism includes a motion controller and a camera monitored laser beam.

10. The variable radii cutter of claim 5 wherein said means for varying the radius of said cutter means includes a manual adjustment, and wherein said means for holding said cutter means at the various radii includes a set screw disposed on said spindle which is fixed to said shaft after setting the radius of said cutter means.

11. The variable radii cutter of claim 1 wherein said cutter means is a ball having an abrasive disposed thereon.

12. The variable radii cutter of claim 11 wherein said ball having a disk for mounting said spindle to said ball.

13. The variable radii cutter of claim 12 wherein said ball is made of rubber.

14. The variable radii cutter of claim 13 wherein said means for varying the radius of said cutter means includes an automated adjustment mechanism including a computer program controlled xyz assembly having a cutter motor, a compression motor, a lead screw, a base support and a work platform cooperating with said variable radii cutter.

15. The variable radii cutter of claim 14 wherein said compression motor cooperating with said lead screw for applying a variable axial force to said cutter means responsive to the geometry of the workpiece placed on said work platform, as programmed, so that said cutter means profiles the particular workpiece geometry to be cut and automatically changes the radii of said cutter means to complete the cut.

16. The variable radii cutter of claim 13 wherein said means for varying the radius of said cutter means includes a manual adjustment, and wherein said means for holding said cutter means at the various radii includes a set screw disposed on said spindle which is fixed to said shaft after setting the radius of said cutter means.

17. A variable radii cutter for cutting various sizes of radii on a workpiece without a need to replace said variable radii cutter for each profile cut on the workpiece, said variable radii cutter comprising:
   a shaft having an upper portion keyed to and slideably coupled to a lower portion such that sliding occurs along a mating key and keyway;
   a spindle disposed in an opposed spaced relationship on said upper portion and on said lower portion of said shaft;
   a cutter means disposed between said spindle and about said shaft, and said cutter means being removably attachable to said spindle;
   said cutter means is one of a blade and a ball;
   said blade being generally rectangular in shape when relaxed and expandable when in a preloaded condition and during a cutting operation to define a generally spherical shape when said blade is disposed between said spindle about said shaft;
   said ball being made of rubber and having an abrasive disposed thereon and a disk for mounting said spindle to said ball;
   means for varying a radius of said cutter means so that various radii may be cut on the workpiece including a profile chosen from the group consisting of a taper, a variable radius, a constant edge radius and a negative radius edge; and
   means for holding said cutter means at the various radii.

18. The variable radii cutter of claim 17 wherein said means for varying the radius of said cutter means includes an automated adjustment mechanism including a computer program controlled xyz assembly utilizing a motion controller and a camera monitored laser beam; said xyz assembly having a cutter motor, a compression motor, a lead screw, a base support and a work platform cooperating with said variable radii cutter wherein said compression motor cooperating with said lead screw for applying a variable axial force to said cutter means responsive to the geometry of the workpiece placed on said work platform, as programmed, so that said cutter means profiles the particular workpiece geometry to be cut and automatically changes the radii of said cutter means to complete the cut.

19. The variable radii cutter of claim 17 wherein said means for varying the radius of said cutter means includes a manual adjustment, and wherein said means for holding said cutter means at the various radii includes a set screw disposed on said spindle which is fixed to said shaft after setting the radius of said cutter means.

20. A method for cutting various sizes of radii on a workpiece with a variable radii cutter without a need to replace said variable radii cutter for each profile cut on the workpiece comprising the steps:
   providing a shaft having an upper portion keyed to and slideably coupled to a lower portion such that sliding occurs along a mating key and keyway;
   providing a spindle disposed in an opposed spaced relationship on said upper portion and on said lower portion of said shaft;
   providing a cutter means;
   said cutter means is one of a blade and a ball;
   said blade being generally rectangular in shape when relaxed and expandable when in a preloaded condition and during a cutting operation to define a generally spherical shape when said blade is disposed between said spindle about said shaft;
   said ball being made of rubber and having an abrasive disposed thereon and a disk for mounting said spindle to said ball;
   disposing said cutter means between said spindle and about said shaft by removably attaching said cutter means to said spindle; and
   providing means for varying a radius of said cutter means so that various radii may be cut on a workpiece with said variable radii cutter; and
   providing means for holding said cutter means at the various radii.

* * * * *